United States Patent
Fontanilla

[19]

[11] Patent Number: 6,060,160
[45] Date of Patent: May 9, 2000

[54] PRESSURE SENSITIVE ADHESIVE TAPE FOR GOLF AND SPORT GRIP BINDING

[75] Inventor: Dennis G. Fontanilla, East Hanover, N.J.

[73] Assignee: Compac Corporation, Netcong, N.J.

[21] Appl. No.: 08/906,748

[22] Filed: Aug. 6, 1997

Related U.S. Application Data

[60] Provisional application No. 60/028,096, Oct. 9, 1996.

[51] Int. Cl.[7] .......................................................... C09J 7/02
[52] U.S. Cl. ........................... 428/346; 428/350; 428/354
[58] Field of Search ..................................... 428/354, 346, 428/350, 355 EN; 156/294

[56] References Cited

U.S. PATENT DOCUMENTS

| | | |
|---|---|---|
| 5,034,082 | 7/1991 | Nolan . |
| 5,258,088 | 11/1993 | Wu . |
| 5,281,288 | 1/1994 | Murray et al. . |
| 5,429,703 | 7/1995 | Hartman et al. . |
| 5,609,932 | 3/1997 | Goetz et al. .......................... 428/36.91 |
| 5,626,955 | 5/1997 | Goetz et al. .......................... 428/315.7 |
| 5,741,391 | 4/1998 | Kennedy .................... 156/391 |

*Primary Examiner*—Jenna Davis
*Attorney, Agent, or Firm*—Edgar A. Zarins; Lloyd D. Doigan

[57] ABSTRACT

A pressure sensitive adhesive tape for bonding a golf grip to a shaft of a golf club. The tape construction includes a carrier or substrate having a pressure sensitive adhesive on one side and an activatable adhesive on the other side. A release liner may be applied to protect the adhesive layers. The pressure sensitive adhesive is utilized to adhere the tape to the shaft of the club leaving the activatable adhesive on the outside of the tape. In a preferred embodiment, the adhesive is activated using a soap-water mixture which causes the adhesive first to become slippery allowing application of the grip and then setting-up to bond the grip to the club. Alternatively, the adhesive may be activated using a solvent.

3 Claims, 2 Drawing Sheets

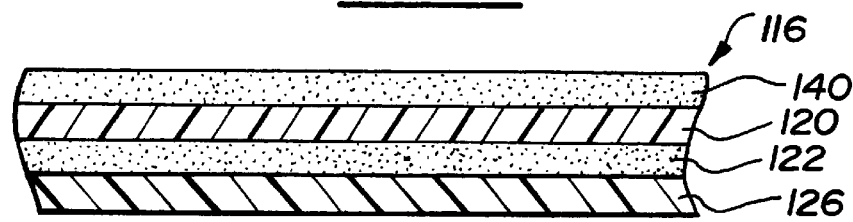
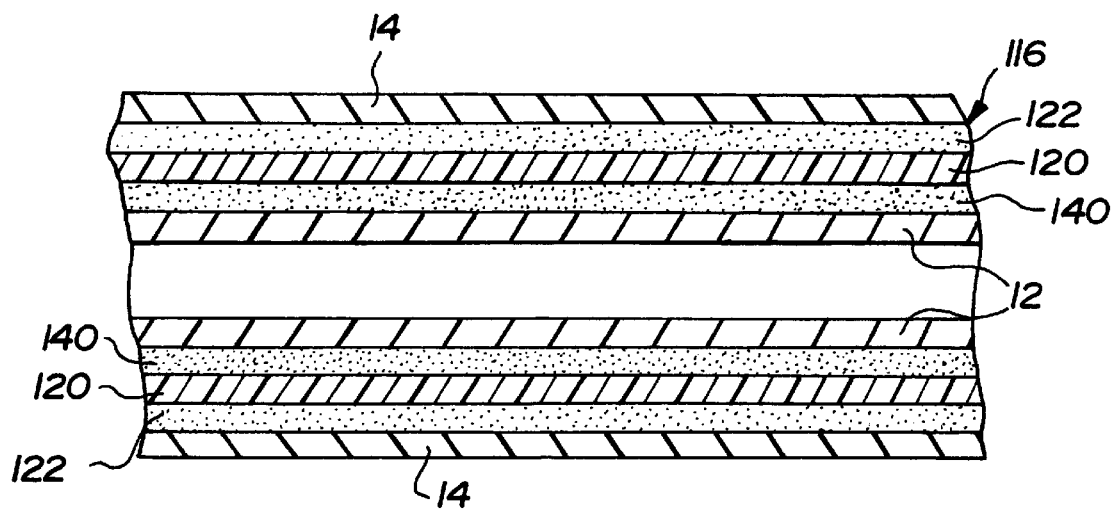

PRESSURE SENSITIVE ADHESIVE TAPE FOR GOLF AND SPORT GRIP BINDING

This invention claims the benefit of U.S. Provisional Patent Application No. 60/028,096 filed Oct. 9, 1996.

BACKGROUND OF THE INVENTION

I. Field of the Invention

This invention relates to a tape construction for bonding a sports grip such as a golf grip to a club shaft and, in particular, to a pressure sensitive adhesive tape to bond a grip to a golf club which is activatable using either the traditional solvents or simple soap-water.

II. Description of the Prior Art

Normally tacky and pressure sensitive adhesive tapes are widely used commercially for a variety of applications. Conventional pressure sensitive tapes comprise a carrier with normally tacky adhesive on one side or both sides to suit a particular bonding application. Such adhesives are normally composed of a rubber polymer, either natural or synthetic, and a resin or resins compatible with the rubber, to impart an inherently tacky character to the adhesive. Such adhesive could also be an inherently tacky acrylic polymer, polyvinyl acetate, or copolymer of either one or both.

Designing an adhesive composition to suit the requirements of different bonding application is very demanding. Bonding two similar or dissimilar flat surfaces is one application. Bonding similar or different curved surfaces capable of being positioned or fitted to each other is another area of application. Bonding strongly a shaft into a tubular member, rigid or non-rigid as a sleeve is a challenge. Any double sided pressure sensitive adhesive tape could be wound around the shaft to strongly hold the shaft, but pose problems when mounting the taped-shaft into the sleeve to hold the sleeve tight, and form a strongly bonded assembly capable of withstanding rotational torque. It would be near impossible to push the taped shaft into the sleeve without some slip-aid.

The forces associated with sports grips require a strongly bonding adhesive yet one which allows insertion of the shaft into the grip. A widely used process involves wrapping a section of a golf club shaft to be covered with the grip with a tape which adheres to the club shaft. The exterior surface of the tape includes an activatable adhesive. Typically, this exterior adhesive is activatable with a solvent which temporarily creates a slippery surface allowing insertion of the shaft into the grip. The exterior adhesive will then set-up or tackify to create a bond between the grip and the club shaft. Although creating a firm bond while simplifying assembly of the grip to the shaft, the primary disadvantage of the prior known system lies in the disposal of the solvent. Many of the solvents are considered hazardous materials and must be properly disposed of.

SUMMARY OF THE PRESENT INVENTION

The present invention overcomes the disadvantages of the prior known tape constructions for bonding a sports grip to a shaft of sports equipment such as a golf club which can be activated using simple soap-water.

The present invention relates to pressure sensitive tape composite that addresses the problem of activating the tape to easily slip into the sleeve, set up in the prescribed period of time with sufficient bond strength for the assembly to be handled in the succeeding processing activities, ease of clean-up, and obtain an ultimate bond for the assembled part or product to withstand the forces that will be acting on the grip during repeated use of the equipment. The present invention also realized the objective of designing a single tape product that alternatively could be used with the solvent activation method.

The preferred construction of the sports grip tape includes:

(a) The Substrate or Carrier—flexible paper, film, or foil with thickness range of 0.5 Mils to 5.0 Mils.

(b) Adhesive, soap-water Activatable—a unique and balanced blend of water resistant adhesive formulations or polymers and water dispersible, water soluble, or water swellable formulations or polymers. The blend proportion could range from one part water resistant component to one part water sensitive component, to one part water sensitive component to nine parts water resistant component. The water resistant component could be the adhesive obtained from prudent formulation design with natural or synthetic rubber tackified with one or more resins like polyterpene resins, hydrocarbon resins, ester resins, and the like. The water resistant pressure sensitive adhesive could also be acrylic polymers or acrylic polymer modified with tackifying resins. Other pressure sensitive adhesives may also be used. Additives like antioxidants, thickener, fillers, colorants, cross linker or curing agent, plasticizer, and other additives may also be included. The water sensitive adhesive component could be an inherently pressure sensitive polymer that is totally water soluble, dispersible or swellable. However, the slippery characteristics of the dry film on soap-water activation, and the cohesive strength as well as the adhesive strength of such water sensitive adhesive is of utmost importance. The water sensitive component could also consist of essentially a polyvinyl methyl ether, an ester of vinyl methyl ether and maleic anhydride copolymer and formaldehyde resin. The modifying water sensitive addition could be a prudent selection of compatible surfactant, natural water soluble gums, polyvinyl alcohol, ammoniated casein, starch, methyl cellulose, polyacrylates, carboxy methyl cellulose, hydroxy ethyl cellulose, glycerin, vinyl pyrolidone, emulsified waxes, and others. Fillers could be clays, calcium carbonate, silicates, aluminum trihydrate, mica and others. Balancing the components results in optimum balance in the desirable properties of slip-adhesion-cohesiveness-clean handling-performance.

(c) Adhesive, solvent activatable.

The adhesive could be a pressure sensitive adhesive based on natural or synthetic rubber tackified with polyterpene, hydrocarbon, ester, or other compatible resins. The adhesive could also be an acrylic polymer or acrylic polymer modified with tackifying resins. When activated by solvent, the characteristic balance of slip-adhesive-strength-cohesive strength-ultimate bond strength-clean handling, must be maintained. The pressure sensitive tape of this invention is usually activate by any one or combination of the active solvents, toluene, trichloroethane, perchlorethylene, methyl ethyl ketone, ethyl acetate, and other solvents.

(d) The Protective Layer

Kraft paper with the basis weight of 10 pounds per thousand square feet to 30 pounds per thousand square feet, coated with silicone release on both sides can be used. Release characteristics, processability, and cost are usually important criteria considered.

The pressure sensitive adhesive tape creates an effective bond for securing a golf grip to the shaft of a golf club to withstand the torsional forces associated with use. Commercial considerations for the exact composition of the tape include tape width, thickness, flexibility, adhesive activation response, ease of liner removal, ease of pushing the activated tape shaft into the grip, adhesion to the shaft, adhesive set-up time, adhesion to the sleeve, ease of final clean-up, torsion or torque strength of the adhesive bonds, moisture resistance and heat resistance. The tape will typically be supplied in a roll for ease of application to the shaft. After removing a release liner to expose the pressure sensitive adhesive, the tape is wrapped around the shaft with the pressure sensitive adhesive engaging the shaft surface. The tape is wrapped over the area to be covered by the grip. Carried on the exterior of the substrate is a pressure sensitive adhesive which can be activated with either soap-water or typical solvents. As a result, the exterior adhesive will become slippery allowing the grip to be applied to the shaft. The adhesive will set-up creating a bond between the shaft and grip.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which:

FIG. 6 is a cross-sectional view of a second embodiment of the tape construction; and FIG. 7 is a cross-sectional view of a club shaft with the tape construction applied thereto.

DETAILED DESCRIPTION OF A PREFERRED EMBODIMENT OF THE PRESENT INVENTION

Figure 1:
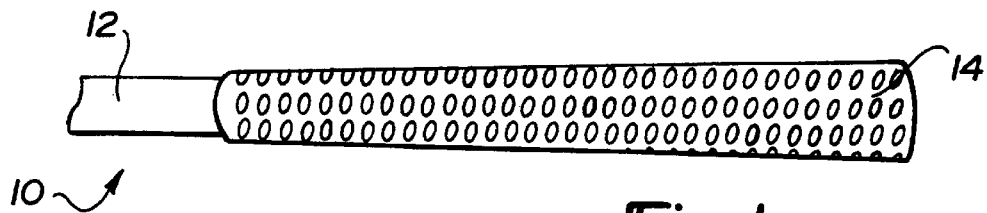
FIG. 1 is a perspective view of an end of a golf club showing a grip mounted thereto.
Figure 2:
FIG. 2 is a view of the golf club shaft with the tape spiral-wound about the shaft.
Figure 3:
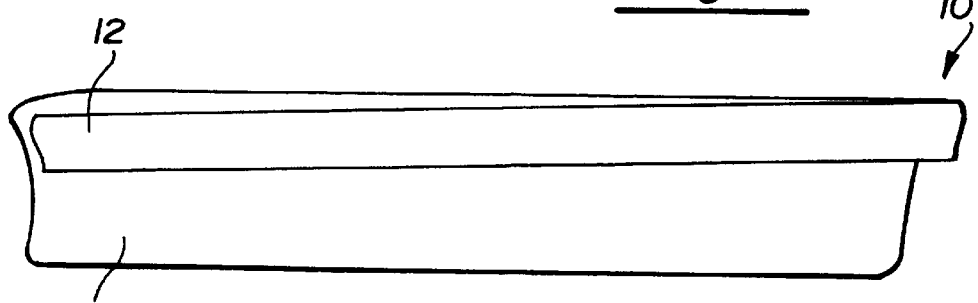
FIG. 3 is an alternative embodiment of applying the tape construction to the shaft.

Referring first to FIGS. 1 through 3, there is shown a piece of athletic equipment, specifically a golf club 10 having a shaft 12 with a grip 14 mounted to the shaft 12 for grasping the club 10. Although the present invention will be described in conjunction with a golf club 10 it is to be understood that the invention may apply to any apparatus requiring a grip or handle to be securely mounted to the device. The present invention facilitates convenient and simple mounting of the grip 14 to the shaft 12 while also ensuring secure mounting capable of withstanding the torsional forces associated with such equipment.

As is well known, the grip 14 is secured to the shaft 12 using a tape 16 or wrap 18 which adheres to the shaft 12 and forms an adhesive bond with an interior surface of the grip 14. FIG. 2 shows the tape 16 spiral wound onto the shaft 12. As an alternative, a sheet 18 of the material may be wrapped onto the shaft 12 (FIG. 3). The embodiments of the present invention may be formed as either a tape 16 or a sheet 18.

Figure 4:
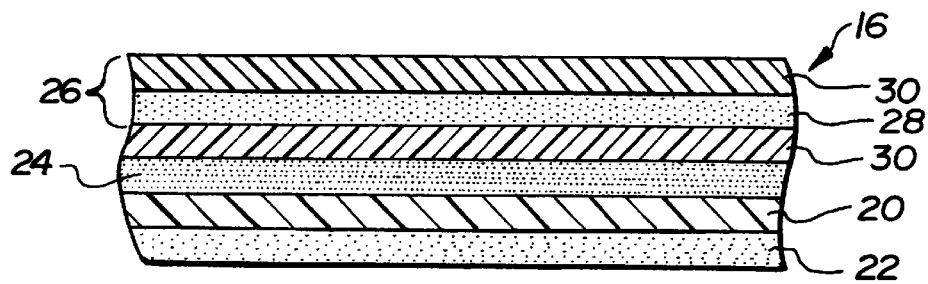
FIG. 4 is a cross-sectional view of a first embodiment of the tape construction.
Figure 5:
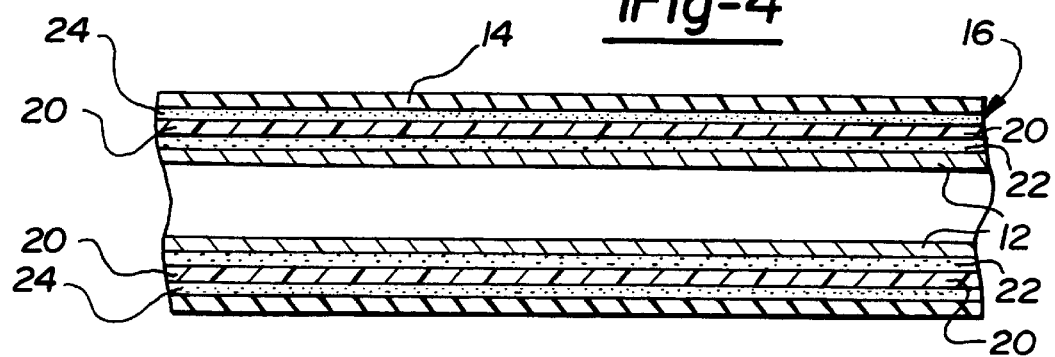
FIG. 5 is a cross-sectional view of a club shaft with the tape construction applied thereto.

Referring now to FIGS. 4 and 5, there is shown a first embodiment of the tape construction 16 for conveniently securing a grip 14 to the shaft 12 of a club 10. The tape 16 includes a substrate or carrier 20 for the adhesive materials which forms the body of the tape 16. This substrate 20 may be formed of flexible paper, film or foil having a thickness in the range of 0.5 mils to 5 mils. Disposed on a first side of the substrate 20 is a layer of solvent activatable pressure sensitive adhesive 22. This adhesive layer 22 performs the dual purpose of adhering the tape 10 to the shaft 12 in one orientation or alternatively acting as the bond between the grip 14 and the tape 16 upon activation using a solvent. Disposed on a second side of the substrate 20 is a layer of soap-water activatable pressure sensitive adhesive 24. Similarly, this adhesive layer 24 performs the dual purpose of, in one orientation, acting as the bond between the grip 14 and the tape 16 upon activation using soap-water or alternatively adhering the tape 10 to the shaft in a second orientation. To protect the soap-water activatable adhesive layer 24, a double-coated silicone release paper 26 is removably applied to the tape 16. The release liner 26 typically comprises a kraft paper 28 coated on both sides with a silicone release coating 30. The release liner 26 is removed to expose the adhesive layer 24 for application of the grip 14.

The solvent activatable pressure sensitive adhesive layer 22 could include a natural or synthetic rubber tackified with polyterpene, hydrocarbon, ester or other compatible resins. The adhesive may be an acrylic polymer or an acrylic polymer modified with tackifying resins. When activated by a solvent, a balance of slipperiness to facilitate insertion into the grip, adhesive and cohesive strength and ultimate bond strength must be maintained. The adhesive layer 22 is usually activated by any one or combination of the solvents toluene, trichloroethane, perchlorethylene, methyl ethyl ketone, and/or ethyl acetate. However, the adhesive is only activated when the layer 22 is oriented away from the club shaft 12. In accordance with the objectives of the present invention, the adhesive layer 22 may be used to adhere the tape 16 to the club shaft 12 through simple pressure adhesion of the tape 16 on the club 10. In this orientation, the adhesive layer 24 will be disposed outwardly while the adhesive layer 22 will bond with the shaft 12.

The soap-water activatable pressure sensitive adhesive layer 24 comprises a balanced blend of water-resistant adhesive formulations or polymers and water dispersible, water soluble or water swellable formulation or polymers. The blend proportions range from one part water resistant formulation with one part water sensitive formulation to one part water sensitive formulation with nine parts water resistant formulation. The water resistant formulation is an adhesive with natural or synthetic rubber tackified with one or more resins such as polyterpene resins, hydrocarbon resins, ester resins and the like. This water resistant adhesive may also be an acrylic polymer or an acrylic polymer modified with tackifying resin. Additives such as antioxidants, thickeners, fillers, colorants, cross-links, curing agents, plasticizers may also be included in the water resistant adhesive.

The water sensitive adhesive formulation is an inherently pressure sensitive polymer which is water soluble, dispersible or swellable. The slippery characteristics of the dry film upon activation using soap-water followed by cohesive set-up strength is of utmost importance. The water sensitive formulation may also consist of a polyvinyl methyl ester, an ester of a vinyl methyl ether and maleic anhydride copolymer and formaldehyde resin. This formulation may also include compatible surfactant, natural water soluble gums, polyvinyl alcohol, ammoniated casein, starch, methyl cellulose, polyacrylates, carboxy methyl cellulose, hydroxy ethyl cellulose, glycerin, vinyl pyrolidine or emulsified waxes. Fillers could include clays, calcium carbonate, silicates, aluminum trihydrate, mica and others. Balancing these compounds results in an optimum balance of slipperiness, adhesion, cohesiveness, and performance.

The tape construction of the present invention allows the application of the grip 14 to the shaft 12 using either a solvent or a soap-water to activate the tape 16 facilitating insertion of the shaft 12 into the grip 14 and subsequent bonding between the shaft and grip. By allowing soap-water activation, the necessity to dispose of a potentially hazardous solvent is avoided. However, if necessary or desired the tape 16 can be activated using a solvent. As shown in FIG. 4, the tape 16 is applied to the shaft 12 by applying the pressure sensitive adhesive 22 against the shaft 12. After removing the release liner 26 to expose the soap-water activatable layer 24, soapy water is poured over the tape 16 on the shaft 12 to activate the adhesive. This causes the adhesive 24 to become slippery allowing the grip 14 to be slipped onto the shaft 12. Once in position, the adhesive 24 will set-up forming a strong adhesive bond between the shaft 12 and the grip 14. In the event solvent activation is desired, the tape 16 is reverse wound on the shaft 12 such that the layer 22 is exposed and the adhesive layer 24 adheres to the shaft 12.

An alternative embodiment of the tape is shown in FIGS. 6 and 7 allowing activation using either a solvent or a soap-water to first facilitate attachment of the grip 14 to the shaft 12 before setting to create a bond capable of withstanding the torsional forces associated with such equipment. The tape 116 includes a substrate 120 made of paper or some similar carrier. An activatable adhesive layer 122 is disposed on a first side of the substrate 120. A coated release liner 126 is removably applied to the adhesive layer 122 to protect the adhesive. Disposed on a second side of the substrate 120 is a pressure-sensitive adhesive layer 140 used to adhere the tape 116 to the shaft 12. It has been found that the soap-water activatable formulation of the first embodiment can be used in a single sided embodiment and can be activated by either soap-water when disposal is a concern or a solvent. Upon activating, the adhesive layer 122 becomes slippery allowing the grip 14 to be positioned on the shaft 12.

A specific embodiment of the golf club tape 116 includes a carrier substrate 120 of fibre leather crepe paper and a release liner 126 of natural brown kraft paper. The activatable adhesive layer 122 includes a soap-water sensitive component which is preferably 75% of an acrylic polymer, 15% of a crosslinked, acid containing acrylic polymer, and 10% of an alkali soluble acrylic polymer as well as a water resistant component such as Polytac 320 which is an acrylic copolymer. This layer 122 of activatable adhesive may be applied to the substrate 120 in two successive passes.

Thus, the present invention provides a tape for applying a grip to a golf club which allows for activation of the adhesive using either a soap-water solution or a solvent solution. Under either circumstance, an environment is created which facilitates insertion of the shaft into the grip eventually creating a bond therebetween capable of withstanding the torsional forces applied to the grip and shaft.

The foregoing detailed description has been given for clearness of understanding only and no unnecessary limitations should be understood therefrom as some modifications will be obvious to those skilled in the art without departing from the scope and spirit of the appended claims.

What is claimed is:

1. An adhesive tape adapted for securing a grip member onto a shaft, said tape comprising:

a carrier layer forming a substrate for said tape;

a first layer of pressure sensitive solvent activatable adhesive disposed on a first side of said carrier, said first layer activatable upon contact with a fluid selected from the group consisting of toluene, trichloroethane, perchlorethylene, methyl ethyl ketone and ethyl acetate; and a second layer of pressure sensitive soap-water activatable adhesive disposed on a second side of said carrier, said second layer activatable upon contact with a soap-water mixture includes a water-resistant adhesive with a water sensitive compound selected from the group consisting of polyvinyl methyl ether, ester of a vinyl methyl ether, malerc anhydride copolymer and formaldehyde resin;

wherein said tape is applied to the shaft with one of said first and second layer adhered to the shaft by said pressure sensitive adhesive and the other of said first and second layers disposed outwardly from the shaft such that upon activation said grip member may be applied over said tape and shaft.

2. The tape as defined in claim 1 wherein said first layer of pressure sensitive solvent activatable adhesive includes a base tackified with a resin selected from the group consisting of polyterpene, hydrocarbon and ester.

3. An adhesive tape adapted for securing a grip member onto a shaft, said tape comprising:

a carrier layer forming a substrate for said tape;

a first layer of pressure sensitive adhesive disposed on a first side of said carrier for adhering said tape to the shaft; and a second layer of selectively activatable adhesive disposed on a second side of said carrier, said second layer of adhesive includes a water-resistant adhesive with a water sensitive compound selected from the group consisting of polyvinyl methyl ether, ester of a vinyl methyl ether, maleic anhydride copolymer and formaldehyde resin, said second adhesive layer activatable upon contact with a fluid selected from the group consisting of a soap-water mixture, toluene, trichloroethane, perchlorethylene, methyl ethyl ketone and ethyl acetate;

wherein said tape is applied to the shaft with said first layer adhered to the shaft by said pressure sensitive adhesive and said second layer disposed outwardly from the shaft such that upon activation said grip member may be applied over said tape and shaft to bond said grip member onto said shaft.

* * * * *